United States Patent
Kami

Patent Number: 5,698,095
Date of Patent: Dec. 16, 1997

[54] METHOD AND APPARATUS FOR HUMAN WASTE TREATMENT

[76] Inventor: Kazuhiko Kami, 7-17, Nankodaihigasi 3-chome, Izumi-ku, Sendai-shi, Miyagi 981, Japan

[21] Appl. No.: 654,776

[22] Filed: May 29, 1996

Related U.S. Application Data

[63] Continuation of Ser. No. 307,773, filed as PCT/JP94/00052, Jan. 14, 1994.

[30] Foreign Application Priority Data

Jan. 28, 1993 [JP] Japan .................. 5-034265

[51] Int. Cl.$^6$ .................................. C02F 1/04
[52] U.S. Cl. .................. 210/173; 210/179; 210/180; 210/188; 210/218; 4/322
[58] Field of Search .................. 210/149, 173, 210/175, 178, 179, 180, 188, 194, 195.1, 209, 218, 742, 754, 758, 760, 764, 766; 4/322

[56] References Cited

U.S. PATENT DOCUMENTS

| | | | |
|---|---|---|---|
| 2,798,227 | 7/1957 | Boester | 210/150 |
| 3,616,913 | 11/1971 | Reid | 210/149 |
| 3,733,617 | 5/1973 | Bennett | 210/173 |
| 3,734,852 | 5/1973 | Borden | 210/175 |
| 3,933,636 | 1/1976 | Daniels | 210/149 |
| 3,936,888 | 2/1976 | Sturtevant | 210/173 |
| 4,350,587 | 9/1982 | Jarrell | 210/173 |
| 5,433,842 | 7/1995 | Morris et al. | 210/175 |

FOREIGN PATENT DOCUMENTS

| | | |
|---|---|---|
| 51-115060 | 9/1976 | Japan . |
| 55-142583 | 11/1980 | Japan . |
| 5998787 | 6/1984 | Japan . |
| 2102778 | 4/1990 | Japan . |
| 3165884 | 7/1991 | Japan . |

*Primary Examiner*—Christopher Upton
*Attorney, Agent, or Firm*—Ronald R. Snider

[57] ABSTRACT

In the agitation chamber (11), the human waste and the flush water from the flush toilet (20) are mixed. A heat accumulator (12) is provided in the discharge path of the exhaust gas. The drying chamber (13) heats the discharge from the agitation chamber (11) using the heat of the heat accumulator (12). The moving device (18) moves the scraper (16) and the suction port of the suction device (17) in the drying chamber (13). The scraper (16) scrapes off the residual human waste stuck in the drying chamber (13). The suction device (17) suctions the residual human waste in the drying chamber (13). The water accumulation chamber (14) recovers the water vapor from the drying chamber (13). The recovered water is transported by the pump (15) to the flush tank (30) for the flush water, and thus recirculated. The space for holding the flush water can be reduced.

15 Claims, 5 Drawing Sheets

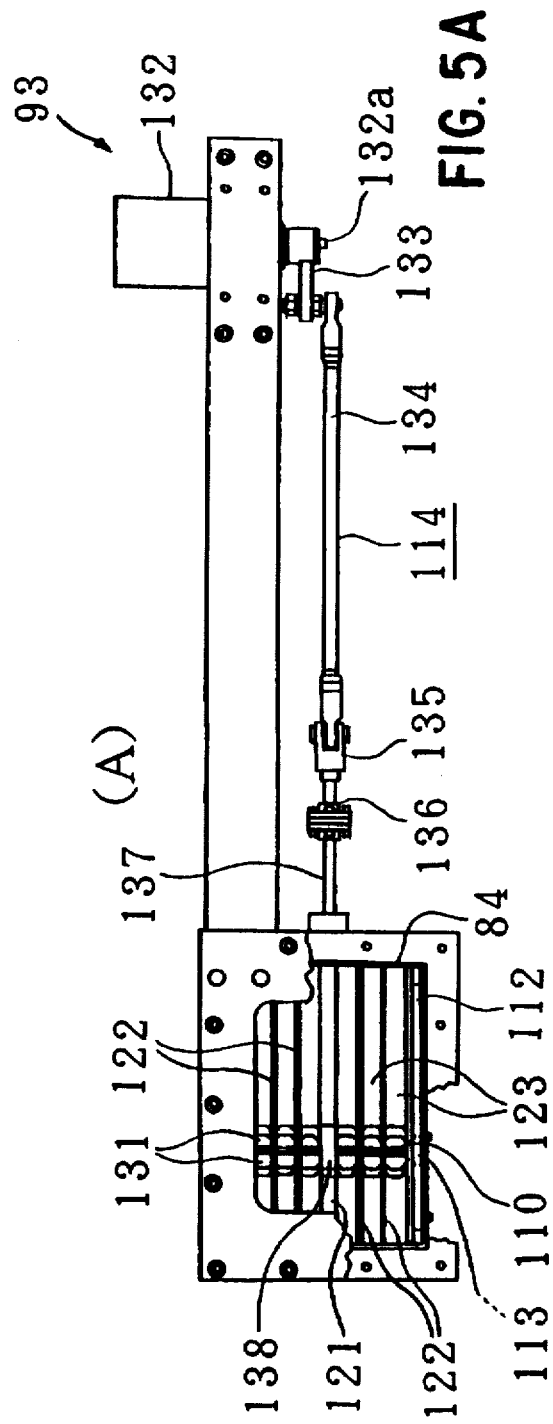
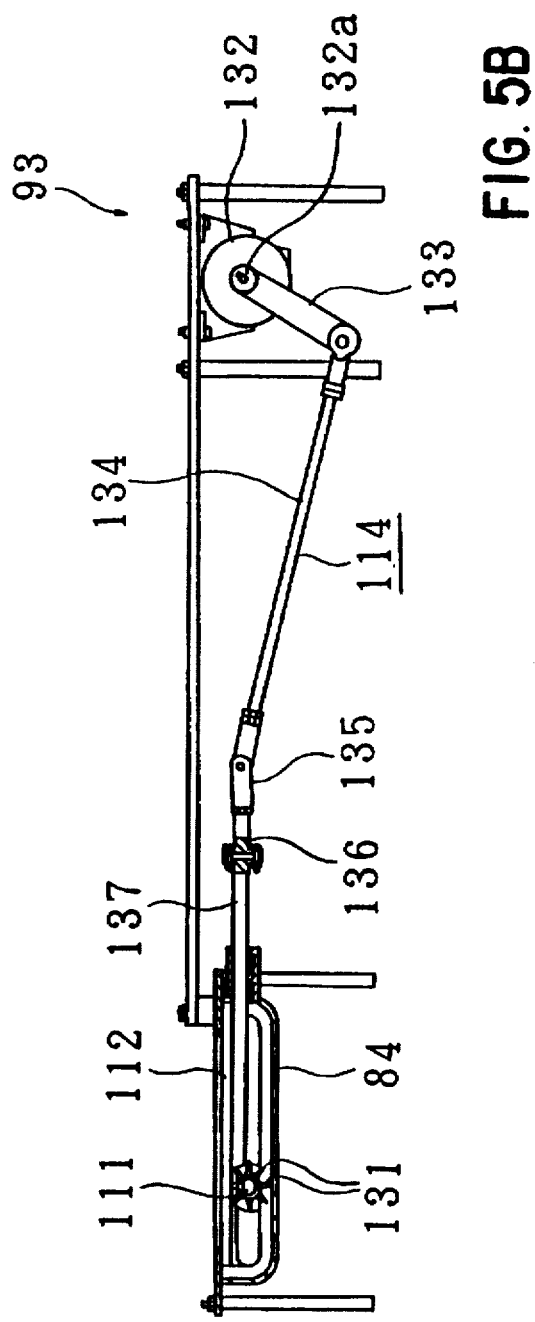

METHOD AND APPARATUS FOR HUMAN WASTE TREATMENT

This application is a continuation of application Ser. No. 08/307,773, filed as PCT/JP94/00052 Jan. 14, 1994.

BACKGROUND OF THE INVENTION

1. Field of the Invention

This invention relates to a method of treating human waste and an apparatus for treating human waste which is installed in a vehicle or a vessel and utilizes its internal combustion engine for a drying treatment of the human waste, as well as vehicles and vessels which are equipped with this apparatus.

2. The Prior Art

An example of the conventional methods of treating human waste and apparatuses for treating human waste is described in Japanese unexamined patent publication (Tokkai) Hei 2-102778.

In this conventional method, human waste, in small fixed quantities, is fed into a flash chamber which is indirectly heated using the exhaust gas from the internal combustion engine, and instantaneously evaporated because of the large heat capacity of the flash chamber. The generated water vapor is mixed with intake air or the exhaust gas of the internal combustion engine and discharged outside.

Another example of the conventional methods of treating human waste and apparatuses for treating human waste employs incineration by electric heat.

In this method, an electric heater wire(s) is installed in an on-board portable toilet. A paper mat is placed on top of it, onto which the bowel is emptied, and then the stool, along with the mat, is incinerated.

However, the conventional method of treating human waste and apparatus for treating human waste described in Japanese unexamined patent publication (Tokkai) Hei 2-102778 had a problem in that since the flash chamber was placed in the discharge path of the exhaust gas, the surface area of this discharge path increased, hence the heat of the exhaust gas easily escaped outside and the temperature of the flash chamber did not rise sufficiently, resulting in a long treatment time of the human waste.

Also, this conventional technology had another problem in that it was necessary to keep a sufficient amount of water in the flush tank in order to flush the human waste into the flash chamber, and the tank required a significant space.

The apparatus which uses electric heat for incineration required several kilowatts of power consumption for incineration, and therefore the incineration took a long time even when a dedicated inverter(s) and/or batteries were used. There were other problems as follows: it was not suitable for treating urine; and, it could not be used for bowel movements during incineration.

This invention was carried out by focusing on these problems, and the object of this invention is to provide a method of treating human waste and an apparatus for treating human waste which make it possible to reduce the space required for holding the flush water, allow a short human waste treatment time, are suitable for treating both urine and stools and allow bowel movements even during the treatment, as well as vehicles and vessels equipped with them.

SUMMARY OF THE INVENTION

In order to achieve the object set forth above, the first item according to this invention is a method of treating human waste which characteristically comprises a heat accumulation process in which the heat of the exhaust gas from the internal combustion engine is accumulated in a heat accumulator, a drying process in which the human waste and the flush water are heated by the heat of said heat accumulator, a recovery process in which the water vapor generated in the drying process is recovered, and a recirculation process in which the water vapor recovered in the recovery process is recirculated as the flush water.

In this method of treating human waste, the heat of the exhaust gas is accumulated in the heat accumulator in the heat accumulation process so as to prevent the heat from escaping to areas other than the human waste drying equipment. In the drying process, the human waste and the flush water are heat-dried by the heat accumulated in the heat accumulator. The water vapor recovered in the recovery process can be recirculated as the flush water in the recirculation process to eliminate wasteful use of the flush water. Because of this, the space required to hold the flush water can be reduced.

The second item according to this invention is a method as described in the first item wherein, in said drying process, the human waste and the flush water are heated in the presence of ozone.

In this method of treating human waste, the vaporized malodorous components from the heated human waste can be oxidized by ozone and thus deodorized.

The third item according to this invention is a method as described in the first item wherein, in said drying process, the human waste and the flush water are heated in the presence of chlorine dioxide.

In this method of treating human waste, the vaporized malodorous components from the heated human waste can be oxidized by chlorine dioxide and thus deodorized. When both ozone and chlorine dioxide are used, deodorization is particularly effective due to the synergetic effect.

The fourth item according to this invention is an apparatus for treating human waste which characteristically comprises a heat accumulator provided in the discharge path of the exhaust gas from the internal combustion engine, a drying chamber provided next to said heat accumulator and connected downstream from the flush toilet in which the human waste and the flush water discharged from the flush toilet is heated, a water accumulation chamber connected to said drying chamber which recovers the water vapor from the drying chamber, and a pump which transports the water from said water accumulation chamber to the flush tank for the flush water.

In this apparatus for treating human waste, the human waste and the flush water discharged from the flush toilet are dried in the drying chamber. The drying chamber is heated by the heat of the heat accumulator. The heat accumulator is heated to a high temperature by the exhaust gas. By accumulating the heat of the exhaust gas in the accumulator, the heat can be prevented from escaping to areas other than the human waste drying equipment. The water vapor from the drying chamber is recovered as the flush water in the water accumulation chamber and transported by the pump to the flush tank for recirculation. This can eliminate wasteful use of the flush water.

For the internal combustion engine, gasoline engines or diesel engines for vehicles and vessels can be used.

A heat accumulator is designed to give some resistance to the passing of the exhaust gas and thus accumulates high temperature heat.

The water recovered in the water accumulation chamber can be used as shower water as well as flush water.

The human waste to be treated can be both urine and stools, or just urine.

The fifth item according to this invention is an apparatus for treating human waste as described in the fourth item wherein said apparatus has an agitating device and also has an agitation chamber connected to said flush toilet and to said drying chamber which mixes the human waste and the flush water discharged from said flush toilet and discharges the mixture to said drying chamber, a scraper provided in said drying chamber which scrapes off the residual human waste stuck inside the drying chamber, a suction device which suctions the residual human waste scraped off from the inside of the drying chamber through a suction port provided in said drying chamber, and a moving device which moves said scraper and said suction port in said drying chamber.

In this apparatus for treating human waste, the human waste and the flush water discharged from the flush toilet are mixed by the agitating device in the agitation chamber, and what is discharged from this agitation chamber is then heated in the drying chamber. By mixing the human waste and the flush water in the agitation chamber, the flowability of the human waste, particularly the stools, can be improved and thus it is easier to transport the human waste to the drying chamber and also to dry the human waste effectively and uniformly. In the drying chamber, the moving device moves the scraper and the suction port of the suction device. The scraper scrapes off the residual human waste stuck inside the drying chamber, and the suction device suctions the residual human waste scraped off from the inside of the drying chamber. This makes it easy to treat the residual human waste.

The sixth item according to this invention is an apparatus for treating human waste as described in the fourth item wherein: said apparatus has a scraper and the scraper has a scraper roller, a rotating shaft, one pair of racks, one pair of spur gears and a reciprocating motion mechanism; said scraper roller is provided in said drying chamber and has a plurality of blades which, when rotated, scrape off the residual human waste stuck to the bottom surface in said drying chamber; said rotating shaft is secured at the center of said scraper roller; said one pair of racks is secured on either side of the inside of said drying chamber; said one pair of spur gears is secured on either end of said rotating shaft and engaged with said racks; and, said reciprocating motion mechanism supports said rotating shaft such that it can rotate, and power-drives said rotating shaft reciprocally in said drying chamber.

In this apparatus for treating human waste, the reciprocating motion mechanism power-drives the rotating shaft reciprocally in the drying chamber. Since the spur gears at either end of the rotating shaft are engaged with the racks, the shaft rotates along with the spur gears as it moves reciprocally. The scraper roller, along with the rotating shaft, rotates and moves reciprocally in the drying chamber. The blades on the scraper can effectively scrape off the residual human waste stuck to the bottom of the drying chamber as they rotate.

The seventh item according to this invention is an apparatus for treating human waste as described in the fourth, fifth or sixth item which characteristically has an ozone generator connected to said drying chamber which delivers ozone to this drying chamber.

In this apparatus for treating human waste, the ozone generator delivers ozone into the drying chamber when the human waste and the flush water are heated in the drying chamber. The ozone oxidizes and deodorizes the vaporized malodorous components from the heated human waste.

The eighth item according to this invention is an apparatus for treating human waste as described in the fourth, fifth, sixth or seventh item wherein said heat accumulator is a muffler or a catalytic converter.

In this apparatus for treating human waste, the muffler or the catalytic converter also serves as a heat accumulator, and therefore the equipment can be made smaller and efficient use of the their high temperatures is possible. The ninth item according to this invention is an apparatus as described in the fourth, fifth, sixth, seventh or eighth item wherein a radiating cooler is provided between said drying chamber and said water accumulation chamber.

In this apparatus for treating human waste, the water vapor from the drying chamber is cooled by the radiating cooler, rapidly liquified and then stored in the water accumulation chamber.

The tenth item according to this invention is a vehicle which has an apparatus for treating human waste as described in the fourth, fifth, sixth, seventh or eighth item. In this vehicle, the apparatus for treating human waste as described above can be provided by utilizing the internal combustion engine in the drive unit and thus effective use of space can be accomplished.

The eleventh item according to this invention is a vessel which has an apparatus for treating human waste as described in the fourth, fifth, sixth, seventh or eighth item. In this vessel, the apparatus for treating human waste as described above can be provided by utilizing the internal combustion engine in the drive unit and thus effective use of space can be accomplished.

The apparatus for treating human waste can be installed not only in vehicles and vessels but also in other means of transportation as well as in buildings. Also, in addition to utilizing the internal combustion engine of the drive unit of a vehicle and such, it is also possible to provide and use a dedicated internal combustion engine for human waste treatment.

BRIEF DESCRIPTION OF THE DRAWINGS

FIG. 5 is a plan view (A) and a longitudinal section (B) showing the scraper of the apparatus for treating human waste of Example 2 of this invention.

DETAILED DESCRIPTION OF THE INVENTION

Examples 1 and 2 of this invention are described below by referring to drawings.

Figure 1:
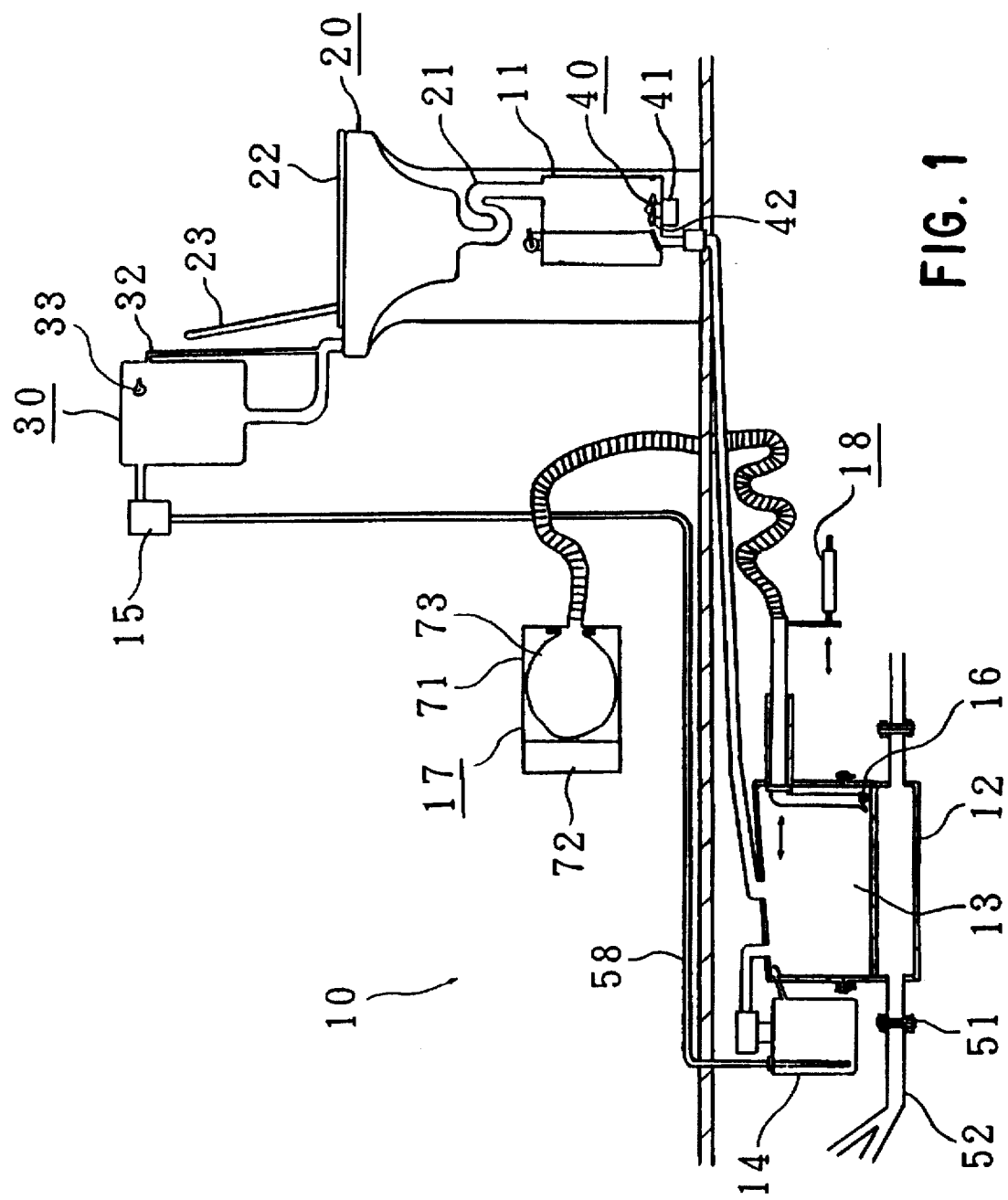
FIG. 1 is a general schematic cross section of the apparatus for treating human waste of Example 1 of this invention.
Figure 2:
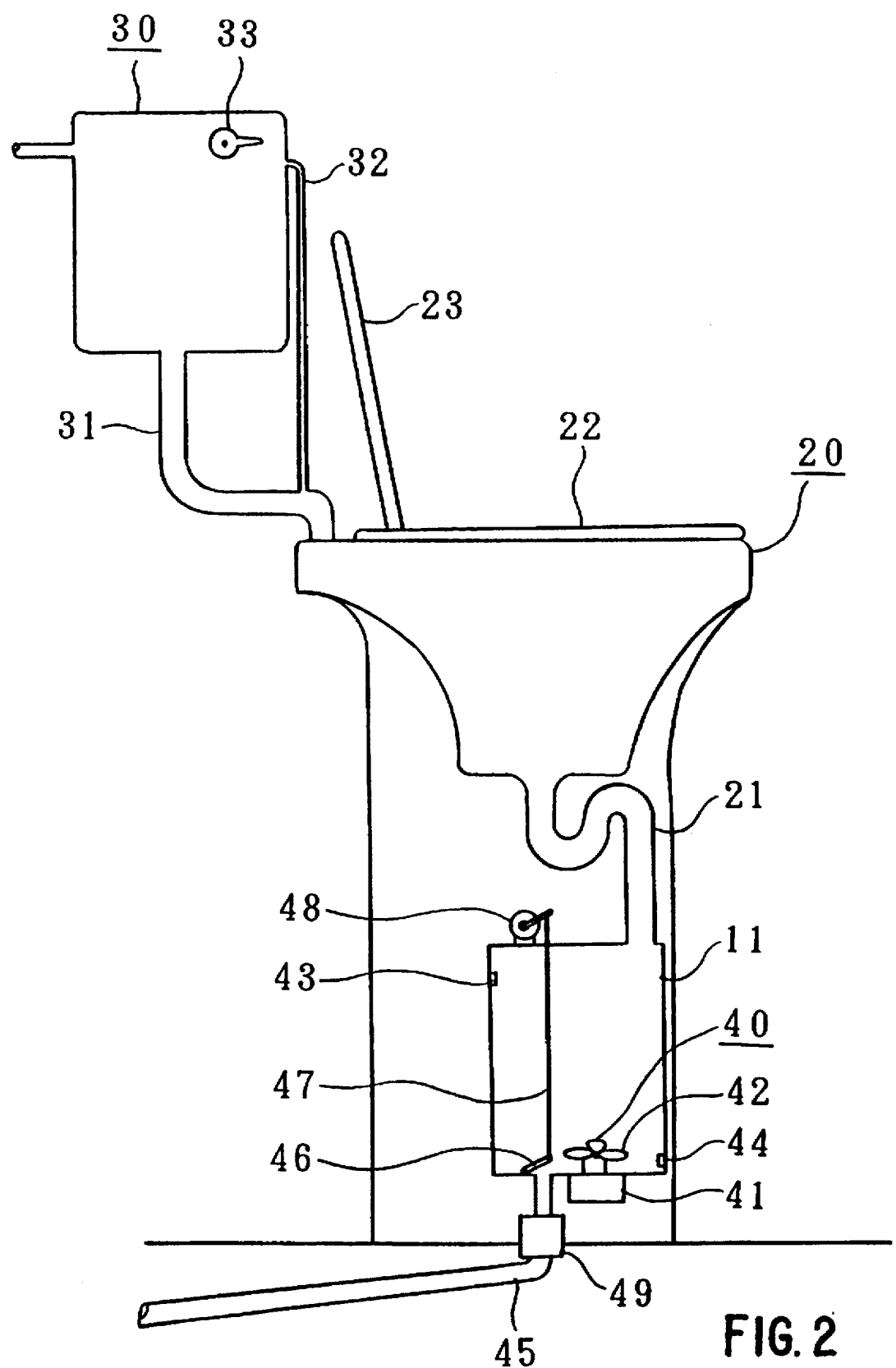
FIG. 2 is a schematic cross section of the agitation chamber of the apparatus for treating human waste of Example 1 of this invention.
Figure 3:
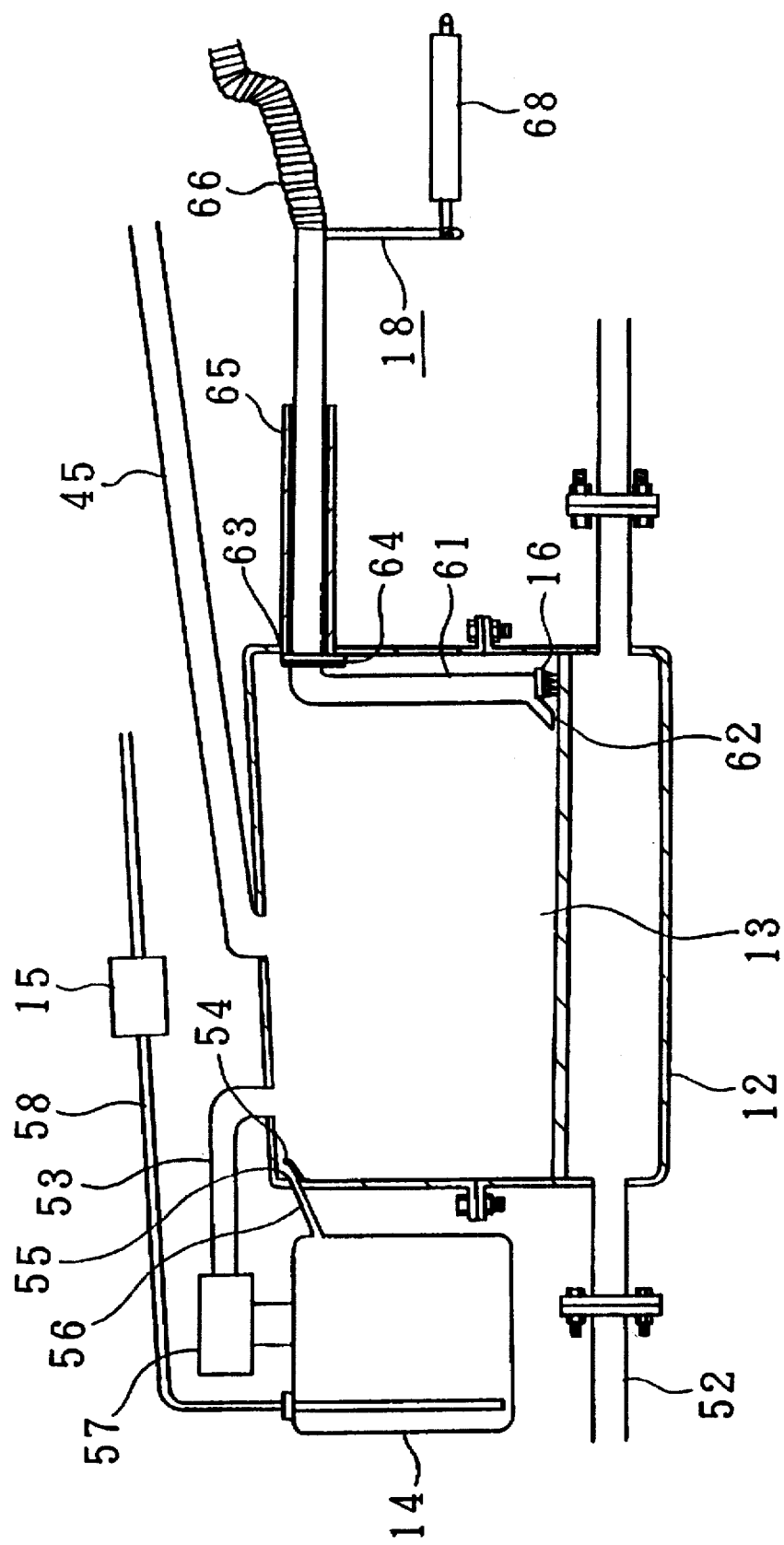
FIG. 3 is a schematic cross section of the drying chamber and its surroundings of the apparatus for treating human waste of Example 1 of this invention.

FIGS. 1 through 3 show Example 1 of this invention.

The apparatus 10 for treating human waste is installed in a large vehicle such as a long distance bus.

As shown in the general view (FIG. 1), the apparatus 10 for treating human waste has an agitation chamber 11, a heat accumulator 12, a drying chamber 13, a water accumulation chamber 14, a pump 15, a scraper 16, a suction device 17 and a moving device 18.

As shown in FIG. 2, the agitation chamber 11 is installed on a floor and its top is connected to a drain pipe 21 of the flush toilet 20. The flush toilet 20 is a Japanese or western type toilet commonly used as an on-board toilet which has a seat 22 and a lid 23. A flush pipe 31 from a flush tank 30 is connected to the flush toilet 20.

The flush tank 30 is divided into a flush water tank which only holds a set amount of water for each bowel movement and a water reservoir which holds water to feed the flush water tank whenever it is emptied. An overflow pipe 32 is provided on the upper part of the flush tank 30 which directs excess water to the flush pipe 31. The flush tank 30 is designed such that the flush water flows via the flush pipe 31 to the flush toilet 20 when a flush switch 33 is turned. The drain pipe 21 has an S-shape bend to prevent a back flow of odor.

The agitation chamber 11 has an agitation device 40 at the bottom. In the agitation chamber 11, an agitation process takes place wherein the human waste and the flush water discharged from the flush toilet 20 are mixed using the agitation device 40. The agitation device 40 has a screw 42 which is rotated by an electric motor 41. The motor 41 is a high speed motor and has a timer in it. An agitation starting sensor 43 and a outflow completion sensor 44 are provided at prescribed heights on the inside wall of the agitation chamber 11.

A discharge tube 45 is provided on the bottom of the agitation chamber 11, and an outflow valve 46 is provided at the opening of the discharge tube 45. An outflow valve actuator 47 is connected to the outflow valve 46. The outflow valve actuator 47 opens and closes the valve using an actuator motor 48 via a link. The discharge tube 45 is connected to the top of a drying chamber 13 via a pump 49. The discharge tube 45 is slanted downward from the agitation chamber 11 toward the drying chamber 13, so that gravity can pull down the discharge.

A heat accumulator 12 is connected via a flange 51 at its end to an exhaust tube 52 from the exhaust manifold of the vehicle engine, and it constitutes a discharge path for the exhaust gas. For the heat accumulator 12, a muffler is used. In the heat accumulator 12, a heat accumulation process is carried out in which some resistance is given to the passing of the exhaust gas so that the heat of the exhaust gas can be accumulated.

As shown in FIG. 3, the drying chamber 13 is provided adjacent to the upper surface of the heat accumulator 12 under the floor of the vehicle. The bottom of the drying chamber 13 is made of a material with good heat conductivity such as stainless steel. The bottom of the drying chamber 13 and the top of the heat accumulator 12 are one unit. The drying chamber is air tight except for passages to the agitation chamber 11, the water accumulation chamber 14 and the suction device 17. The drying chamber 13 is connected via the discharge tube 45 to the agitation chamber 11. In the drying chamber, a drying process is carried out in which the mixed discharge from the agitation chamber 11 is heated at the top of the heat accumulator 12 using its heat. A moisture sensor is provided in the drying chamber 13.

As shown in FIG. 3, the water accumulation chamber 14 is connected via a pipe 53 to the top of the drying chamber 13 and placed under the floor. In the water accumulation chamber 14, a recovery process is carried out in which the water vapor from the drying chamber 13 is recovered. The ceiling of the drying chamber 13 is slanted downward to the side on which the pipe 53 is attached. Along this slope, around the upper portion of the wall, a drip receptacle 54 is provided. A hole 55 is provided on the lowest part of the side surface of the drip receptacle 54, and the hole 55 communicates, by means of an outflow pipe 56, with the upper part of the inside of the water accumulation chamber.

A deodorizing filter 57 is provided in the middle of the pipe 53. The deodorizing filter is equipped with a suction fan. This suction fan forcefully suctions gas from inside the drying chamber and thus accelerates the drying process of the human waste. In order to prevent moisture in the water vapor from escaping outside, a pressure reducer which releases only the vapor pressure outside and recovers the moisture can be installed in the recovery process. A water level detector is provided at a prescribed height in the water accumulation chamber. The water level detector consists of a float-type shading panel and a shade sensor.

The water accumulation chamber 14 is connected via a pipe 58 to the flush tank 30. The pump 15 is provided in the middle of the pipe 58. The pump 15 carries out the recirculation process in which the water inside the water accumulation chamber 14 which was recovered by the recovery process is transported to the flush tank 30.

The scraper 16 is provided in the drying chamber 13. The scraper 16 has a plurality of pads of needles of the same height (hereafter referred to as "needle pads") which are in contact with the bottom surface of the drying chamber 13. The scraper 16 is designed to scrape off the residual human waste stuck to the inside of the drying chamber by means of these needle pads. The scraper 16 is installed on the suction pipe 61 of the suction device 17.

The suction device 17 has a suction opening 62 at the tip of the suction pipe 61 in the drying chamber 13. The suction opening 62 is positioned near the needle pads of the scraper 16, facing the bottom surface of the drying chamber 13. The suction device 17 is designed to suction the residual human waste scraped off the drying chamber 13 through this suction opening and the suction pipe 61.

In the drying chamber 13, the suction pipe 61 runs vertically to the bottom surface, bends at a right angle and extends outside through a wall opening 63 of the drying chamber 13. A gasket 64 is provided at the wall opening 63 to prevent the gas in the drying chamber 13 from leaking outside.

A guide cylinder 65, perpendicular to the wall surface, is provided outside the wall opening 63. The suction pipe 61 runs through the guide cylinder 65 and connects to a flexible hose 66 which in turn connects to the main unit 71 of the suction device 17.

The moving device 18 has an actuator 68 which is connected to the suction pipe 61 outside of the guide cylinder 65. The actuator 68 is driven by a motor to move reciprocally, then in turn it makes the suction pipe 61 move reciprocally along the guide cylinder 65, and this causes the scraper 16 and the suction opening 61 to move along the bottom surface of the drying chamber 13.

The main unit 71 of the suction device 17 is placed on the floor of the toilet room. The main unit 71 has a suction motor 72 and a collection pack 73. The suction device 17 is designed to collect in the collection pack 73 that which has been suctioned through the suction opening 62 by the action of the suction motor 72.

The collection pack 73 is a disposable one-touch cassette installed in the main unit. A deodorizer-disinfectant is contained in the collection pack 73. A full-pack sensor is provided in the main unit 71 which detects that the collection pack 73 is full. A light is provided outside the main unit 71 which flashes when the full-pack sensor detects a full pack.

The actions of Example 1 are explained below.

A person enters the toilet room and has a bowel movement on the flush toilet 20, and then turns the flush switch 32 to lift the float in the flush tank 30 so that the flush water flows from the flush tank 30 into the flush toilet 20. That is, this toilet can be used in the same manner as common toilets. A deodorant-disinfectant is mixed in the flush water. In the flush water tank of the flush tank 30, the float shuts the flush pipe 32 after a prescribed amount of water has flowed out, and thus the water discharge to the flush toilet stops. At the same time, the pump starts supplying water from the water reservoir to the flush water tank. When the sensor signals a full flush water tank, the pump stops.

The water which has flowed into the flush toilet 20 flushes the stool and flows into the agitation chamber 11 via the drain pipe 34. When human waste in the agitation chamber reaches a certain level, the agitation starting sensor 43 activates the motor 41. The motor 41 turns the screw 42 for a fixed amount of time until a timer times out. The duration of the motor operation set by the timer is the time required for the stools to become sludge-like.

In the agitation chamber, the human waste and the flush water are mixed to improve the flowability of the human waste, particularly the stools, thus making it easier to transport the human waste to the drying process and also to dry the human waste effectively and uniformly.

When the timer times out, the motor 41 stops, and right after this the actuator motor 48 is activated via a relay. Driven by the actuator motor 48 via a link, the outflow valve actuator 47 opens the valve. The agitated human waste is forced by the pump 49 to go through the discharge tube 45 and flow into the drying chamber 13. Responding to the outflow completion sensor 44, the outflow valve actuator 47 closes the valve.

In the heat accumulation process, the heat accumulator 12 accumulates the heat of the exhaust gas from the exhaust manifold via the exhaust tube 52, and thus prevents the heat from escaping to areas other than the equipment for drying human waste. Since the heat accumulator gives resistance to the passing of the exhaust gas, it is sufficiently heated by the exhaust gas up to as high as approximately 800 degrees. Therefore, in the drying process, the mixture from the agitation process is heated and dried in the drying chamber by using the heat of approximately 800 degrees accumulated in the heat accumulator 12. The heat accumulator also serves as a muffler and it can efficiently utilize its high temperature.

Once introduced into the drying chamber 13, the human waste starts to dry immediately. In the drying process, the water vapor in contact with the ceiling of the drying chamber 13 turns into water droplets, flows along the sloped ceiling and the upper part of the wall, into the drip receptacle 54, through the outflow pipe, and into the water accumulation chamber 14. At the same time, the water vapor in the drying chamber 13 is driven by the fan through the pipe 53 and the deodorizing filter 57, turned into water droplets and delivered to the water accumulation chamber 14. Since the moisture in the mixture of the flush water and the human waste is heated and recovered as water vapor, the recovery process is easy.

When a moisture sensor detects there is no moisture in the drying chamber 13, the motor for the moving device 18 and the suction motor 72 of the suction device 17 are activated.

This starts operation of the actuator 68 and the suction device 17. The actuator 68 uses a relay to move reciprocally, and it moves the scraper 16 and the suction opening 62 attached to the suction pipe 61 in the drying chamber 13.

The scraper 16 scrapes off the residual human waste stuck in the drying chamber 13, and the suction device 17 suctions the residual human waste scraped off in the drying chamber 13. This makes treatment of the residual human waste easy. The stop position of the actuator 68 is set by the relay at a fully shrunk position. The actuator 68 stops at the stop position after a prescribed number of reciprocal motions according to the setting of the relay or the timer.

The residual human waste scraped off by the scraper 16 is suctioned in through the suction opening 62, transported through the suction pipe 61 and collected in the collection pack 73 of the main unit 71. Since the volume of the initial human waste is reduced by the drying process to the volume of the residual human waste, many bowel movements can be handled by one collection pack 73.

When the collection pack 73 becomes full, the sensor detects it, and the light outside the main unit 71 responds to this by flashing. This will signal a full collection pack 73 to the operator and the operator discards the full collection pack 73 and installs a new collection pack 73 in the main unit 71. The used collection pack 73 can be disposed of as "combustible garbage" in the same manner as common garbage.

In the water accumulation chamber 14, the water level detector detects when a certain amount of water is accumulated. That is, the float-type shading panel floats up on the water accumulated inside and the shade sensor at the upper portion of the water accumulation chamber 14 detects this. Responding to the shade sensor, the pump 15 starts running. In the recirculation process, the pump 15 recirculates the water vapor recovered in the recovery process via the pipe 58 to the flush tank 30 for use as flush water, thus eliminating wasteful use of the flush water.

When the amount of water in the water accumulation chamber 14 is reduced, the float-type shading panel lowers and the shade sensor at the lower portion of the water accumulation chamber 14 detects this. Responding to the shade sensor, the pump 15 stops. When the flush tank 30 becomes full of water, the excess water flows down through the flush pipe 31 to the flush toilet 20.

As described above, the apparatus 10 for treating human waste can utilize an internal combustion engine of the drive unit for a vehicle, and hence no energy dedicated to treating human waste is required. Also, since the human waste is not burned in the flush toilet 20, there is no fire hazard. Furthermore, nowhere in the entire process is exhaust gas introduced into the devices, hence there is no risk of gas poisoning and such due to back flow of the exhaust gas.

Since the water vapor generated in the human waste treating process is recovered, pollution of the outside air and malodor can be prevented.

Also, since the human waste is treated in a place other than the flush toilet 20, it is not necessary to prohibit the use of the toilet during this treatment. Since the toilet is a flush type, there is no malodor and the toilet is sanitary.

Also, since the apparatus 10 for treating human waste does not change the internal configuration of the exhaust tube 52, it does not affect the engine performance. The apparatus 10 for treating human waste can easily be installed in a common vehicle by replacing the muffler or catalytic converter with the heat accumulator 12 and installing the rest of the apparatus 10 for treating human waste in the vehicle. The modifications are easy.

On the flush tank 30, a scale or light can be provided which indicates the internal water level is lower than a certain level.

In the toilet room or a passenger room, a light or buzzer can be provided to alarm people that the toilet cannot be used when the amount of human waste in the agitation chamber 11 and the drying chamber 13 is more than a certain level.

Figure 4:
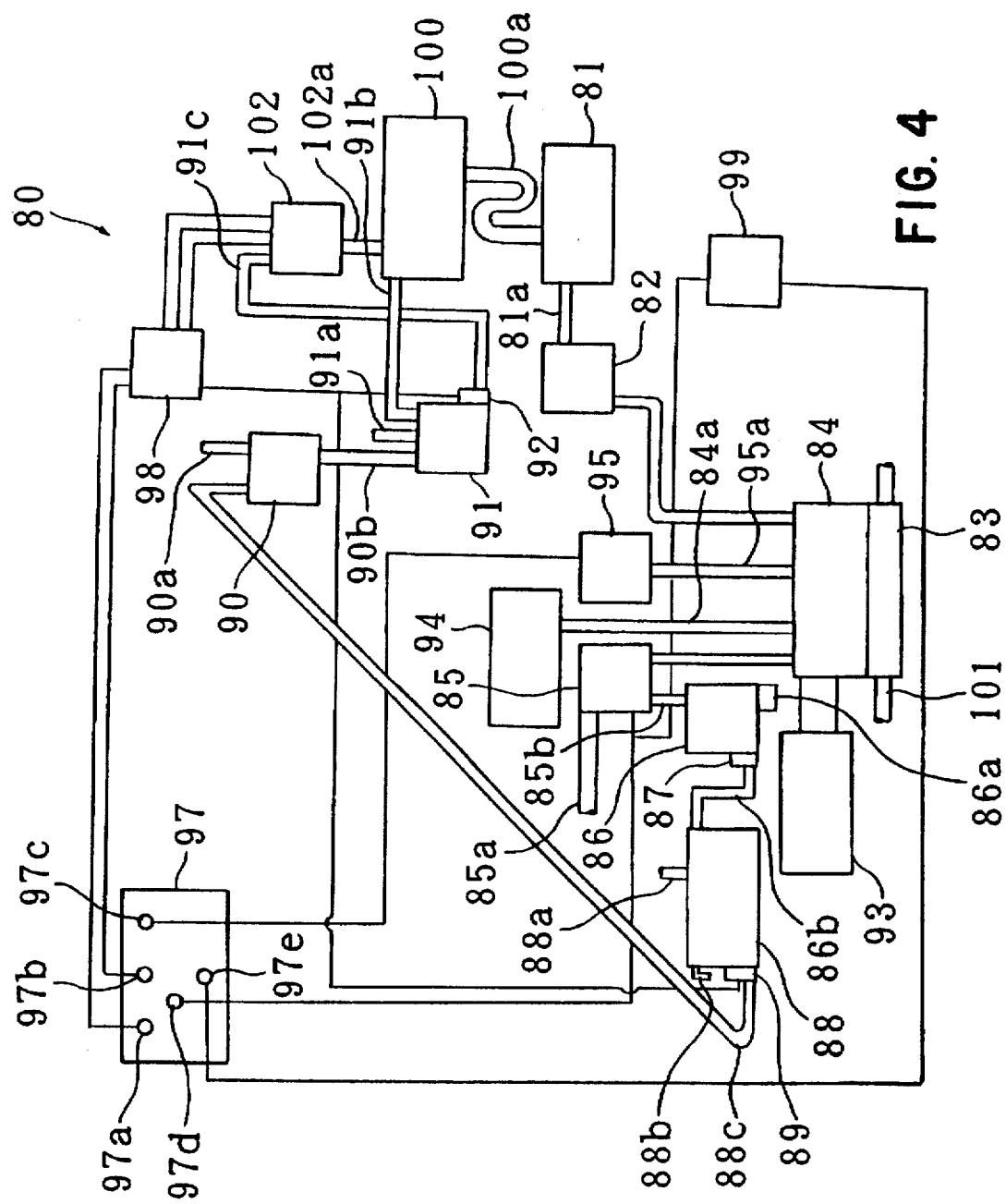
FIG. 4 is a block diagram which shows a general view of the apparatus for treating human waste of Example 2 of this invention.

FIGS. 4 and 5 show Example 2 of this invention.

The apparatus 80 for treating human waste is installed in a camper.

As shown in the general view (FIG. 4), the apparatus 80 for treating human waste has an agitation chamber 81, a vapor check valve 82, a heat accumulator 83, a drying chamber 84, a radiating cooler 85, a water collection tank 86, a pump 87, a water accumulation chamber 88, a pump 89, a filtering tank 90, a deodorant tank 91, a pump 92, a scraper 93, a suction device 94, an ozone generator 95, a monitor panel 97 and relays 98 and 99.

The agitation chamber 81 is connected to a drain pipe 100a of the flush toilet 100. The agitation chamber 81 is equipped with an agitation device and a drain pump. In the agitation chamber 81, a full-chamber sensor and waste water sensor are provided. The full-chamber sensor detects when there is more than a certain amount of human waste and such accumulated in the agitation chamber 81. The waste water sensor detects when human waste and such flows into the agitation chamber 81.

A drain pipe 81a from the agitation chamber 81 connects via the vapor check valve 82 to the drying chamber 84. The drying chamber 84 is placed in contact with the top surface of the heat accumulator 83. The heat accumulator 83 connects on both sides to the exhaust tube 101 of the engine (not shown). The heat accumulator 83 accumulates the heat of the engine exhaust gas and reaches a high temperature.

The drying chamber 84 is designed to heat the human waste and the flush water discharged from the flush toilet 100 by using the heat of the heat accumulator 83. The radiating cooler 85 is connected to the exhaust pipe 84a of the drying chamber 84. The radiating cooler 85 consists of a radiator equipped with a forced cooling fan. The radiating cooler 85 is designed to start operation at the same time that the drain pump of the agitation chamber 81 runs, continue to operate during the human waste treating process, and stop when the treatment process is complete. An air intake duct 85a is connected to the radiating cooler 85. The water collection tank 86 is connected to the drain pipe 85b of the radiating cooler 85.

A collected-water sensor 86a is provided in the water collection tank 86. A water reservoir chamber 88 is connected to a water pipe 86b of the water collection tank 86. When a certain amount of water is accumulated in the water collection tank 86, the collected-water sensor 86a detects this and activates the pump 87 to pump the water in the water collection tank 86, via the water pipe 86b, to the water reservoir chamber 88.

Via the radiating cooler 85 and the water collection tank 86, the water reservoir chamber 88 recovers the water vapor from the drying chamber 84 as liquid water. A gas breather tube 88a and an excess water discharge tube 88b are connected to the water reservoir chamber 88. The filtering tank 90 is connected to a water pipe 88c of the water reservoir chamber 88. The filtering tank 90 filters water from the water reservoir chamber 88 by means of activated charcoal and a filter. An air breather tube 90a is connected to the filtering tank 90.

The deodorant tank 91 is connected to the drain pipe 90b of the filtering tank. The deodorant tank 91 accommodates a plurality of gel-form solid balls with a diameter of approximately 30 mm. These gel-form solid balls contain chlorine dioxide and are water soluble.

An air breather tube 91a is connected to the deodorant tank 91. A water supply tube 91b is connected to the deodorant tank 91 so that water can be supplied from the top of the flush toilet 100 to the deodorant tank 91. A flush tank 102 is connected to the water pipe 91c of the deodorant tank 91. The pump 92 pumps the water in the deodorant tank 91 via the water pipe 91c to the flush tank 102.

An empty-tank sensor and a full-tank sensor are provided in the flush tank 102. The empty-tank sensor detects when the amount of water in the flush tank 102 is less than a certain amount and activates pumps 89 and 92. The full-tank sensor detects when the amount of water in the flush tank 102 is more than a certain amount and stops pumps 89 and 92. The water supply pipe 102a of the flush tank 102 is connected to the flush toilet 100. Thus, the human waste and the flush water in the flush toilet recirculates as the flush water. A perfume can be put in the flush tank 102.

As shown in FIG. 5, the scraper 93 has a scraper roller 110, a rotating shaft 111, one pair of racks 112 and 112, one pair of spur gears 113 and 113, and a reciprocating motion mechanism 114. The scraper roller 110 is installed in the drying chamber 84.

The drying chamber 84 has a thick rail 121 at the middle of the inner bottom, and 2 thin rails 122 and 122 on each of the two sides divided by the rail 121. The scraper roller 110 has a plurality of blades 131, 131, ... in a radial fashion. The blades 131, 131, ... are lined up along the length of the scraper roller 110 with spaces for the rails 121, 122 and 122 in between. They are designed to rotate along the grooves between the rails 121, 122 and 122. The blades 131, 131, ... scrape off the residual human waste stuck to the bottom of the drying chamber 84 as they rotate.

The rotating shaft 111 is fixed at the center of the scraper roller 110. Said one pair of racks 112 and 112 is secured on either side of the inside of the drying chamber 84. Said one pair of spur gears 113 and 113 is secured on either end of said rotating shaft 111 and engaged with said racks 112 and 112.

The reciprocating motion mechanism 114 has a cyclo-gear motor 132, a crank arm 133, a crank shaft 134, a knuckle 135, a flange hub 136, a slide shaft 137 and a bearing 138. The crank arm 133 is fixed to the rotating shaft 132a of the cyclo-gear motor 132, and the crank shaft 134 is attached to the crank arm 133 in such a way that it can rotate. The slide shaft 137 is attached to the crank shaft 134 via the knuckle 135 and the flange hub 136 in such a way that it can rotate. The bearing 138 is installed at the tip of the slide shaft 137 and supports the rotating shaft 111 in such a way that the rotating shaft can rotate. The reciprocating motion mechanism 114 drives the rotating shaft 111 reciprocally in the drying chamber 84.

As shown in FIG. 4, the suction device 94 is connected to the drying chamber 84, and is designed to suction the residual human waste in the drying chamber 84. The ozone generator 95 is a device which generates ozone. The ozone generator 95 delivers the generated ozone to the drying chamber 84 via a release tube 95a.

The monitor panel 97 has a system operation light 97a, a water supply pump light 97b, an ozone generator light 97c, a cooling fan light 97d and a "toilet not ready" light 97e. The system operation light 97a is connected via the relay 98 to the full-tank sensor and the empty-tank sensor in the flush tank 102, and turns on when the apparatus 80 for treating human waste as a whole is in operation. The system operation light 97a turns off when the pumps 89 and 92 are running.

The supply pump light 97b is connected via the relay 98 to the pumps 89 and 92, and turns on when the pumps 89 and 92 are in operation. The ozone generator light 97c is connected to the ozone generator 95, and turns on to indicate that the ozone generator 95 is dispensing ozone properly. The cooling fan light 97d is connected to the radiating cooler 85, and turns on to indicate that the radiating cooler 85 is in operation.

The "Toilet not ready" light 97e is connected via the relay 99 to the full-chamber sensor and the waste water sensor in the agitation chamber 81. The "Toilet not ready" light 97e turns on when the full-chamber sensor senses that there is more than a certain amount of human waste and such accumulated in the agitation chamber 81, and turns off when the amount of human waste and such is less than a certain amount. The use of the flush toilet 100 should be prohibited when the "Toilet not ready" light 97e is on.

The actions of Example 2 are described below.

Human waste discharged into the flush toilet 100 is flushed into the agitation chamber 81 along with flush water from the flush tank 102. When the waste water sensor in the agitation chamber 81 senses the human waste and such, the agitation device begins operation and agitates the human waste and such. In the agitation chamber 81, the human waste and such, i.e. stools, urine, toilet paper, the flush water, etc. are mixed and made sludge-like. Signaled by the timer, the drain pump runs and the sludge-like human waste and such are transported through the vapor check valve 82 to the drying chamber 84.

The human waste and such receive a heat treatment at a high temperature of 600°–800° C. At the same time that the drain pump of the agitation chamber 81 runs, the scraper device 93 operates. In the reciprocating motion mechanism 114, the cyclo-gear motor 132 rotates the crank arm 133 and the crank shaft 134 is moved by the arm. The crank shaft reciprocally moves, via the slide shaft 137 and the bearing 138, the rotating shaft 111 in the drying chamber 84.

Since the spur gears 113 and 113 at either end of the rotating shaft 111 are engaged with the racks 112 and 112, the shaft rotates along with the spur gears 113 and 113 as it moves reciprocally. The scraper roller 110, along with the rotating shaft 111, rotates and moves reciprocally in the drying chamber 84. The blades 113, 113, . . . of the scraper 110 rotate to stir the sludge-like human waste and such in the drying chamber 84. By doing this, the drying time of the human waste and such can be shortened.

When the moisture content in the human waste and such becomes low, the human waste and such stick to the bottom surface of the drying chamber and form a hard film. Since the clearance between the heated bottom surface and the blades 113, 113, . . . of the scraper 110 is fixed, the hardened film of the human waste and such becomes a load on the scraper 93. The cyclo-gear motor 132 has a built-in relay and it stops the cyclo-gear motor 132 when there is a load on the scraper 93.

With the scraper 93 halting, the hardened film of the human waste and such are carbonized by the heating. The carbonized human waste and such spontaneously peel off from the bottom surface of the drying chamber 84, and become charcoal-like residual human waste. The scraper 93 resumes its operation several minutes, as set by a timer, after it stopped due to the load.

The resuming scraper 110 scrapes off and crushes the residual human waste stuck to the bottom surface of the drying chamber 84, and turns this into fine carbonized particles in several minutes. If the residual human waste is not sufficiently carbonized when the scraper resumes its operation, the scraper roller 110 is stopped by the relay for a second time and resumes its operation after several minutes. The carbonized residual human waste in the drying chamber 84 is suctioned by the suction device 94 which starts operation when triggered by a timer. The suction device 94 collects the residual human waste in a disposable pack.

The flush water which flows out from the flush tank 102 contains chlorine oxide which dissolved from the gel-form solid balls in the deodorant tank 91. Therefore, the human waste and such sent to the drying chamber contains dissolved chlorine dioxide. Also, the ozone generator 95 is constantly dispensing ozone into the drying chamber 84. Because of this, the drying chamber 84 is filled with ozone gas and chlorine dioxide gas.

Chlorine dioxide dissolved in the human waste and such is heated and vaporized in the drying chamber 84. The vaporized chlorine dioxide oxidizes and deodorizes malodorous components from the human waste such as ammonia which evaporated at the same time. Ozone also oxidizes and deodorizes malodorous components from the human waste. Because of the synergetic effect of using both ozone and chlorine dioxide, the power of oxidizing the malodorous components improves substantially and nearly perfect deodorization is possible.

As a deodorizing method in a heat-evaporated state, even ozone alone can substantially deodorize the malodorous components of the human waste. However, more effective deodorization is possible by using chlorine dioxide in addition.

When preparing the gel-form solid containing chlorine dioxide, the concentration of chlorine dioxide in the gel-form solid can be adjusted higher so that even chlorine dioxide alone can almost completely deodorize the malodor of the human waste. Various germs in in the drying chamber 84 are completely sterilized by a combined sterilizing effect of the high temperature and ozone/chlorine dioxide.

When the human waste and such are in the drying chamber 84, the radiating cooler 85 is in operation. The water vapor discharged from the drying chamber 84 is immediately cooled by the radiating cooler 85 and turns into liquid water with a temperature of approximately 20° C. The cooled water is then transported through the water collection tank 86 into the water reservoir chamber 88. Although the water vapor in the drying chamber 84 expands due to the heating, the back flow toward the flush toilet 100 is prevented by the vapor check valve 82.

The water accumulated in the water reservoir chamber 88 is pumped up to the filtering tank 90 by the pump 89, and transported via the deodorant tank 91 into the flush tank 102. The water in the flush tank 102 is now flush water and flows into the flush toilet 100, thus completing the recirculation.

When the waste water sensor of the agitation chamber 81 detects the human waste and such again, the agitation device runs again and the treatment is repeated. If the amount of the human waste and such which flows into the agitation chamber 81 is more than the treatment capacity of the drying chamber 84, then the drain pump of the agitation chamber 81 transports the human waste and such to the drying chamber 84 in an amount within the treatment capacity. While the treatment process of that human waste is under way, the power to the waste water sensor of the agitation chamber 81 is cut off by means of a relay, and therefore the agitation device and the drain pump in the agitation chamber 81 do not run. After the human waste treatment process is completed, the relay connects the waste water sensor to the power supply, and the remaining human waste and such in the agitation chamber 81 is then treated.

To give an example of the treatment, when driving at a speed of 60–70 km/hour, one human waste treatment process in the apparatus 80 for treating human waste can treat 500–700 ml of human waste and 600 ml of the flush water in one hour.

Rather than all the water vapor generated in the drying chamber 84 being recirculated, a part of it can be discharged into the exhaust tube 101. In this case, even if the discharged water vapor is not sufficiently deodorized, it will be deodorized by the oxidation action of the nitrogen oxides contained in the exhaust gas and also masked by the odor of other components in the exhaust gas.

The apparatus 80 for treating human waste can be dedicated to urine treatment. In this case, the scraper 93 and the suction device 94 can be omitted to make a simpler apparatus.

INDUSTRIAL APPLICATIONS

The method and the apparatus for human waste treatment according to this invention use the heat of the heat accumulator to dry the human waste in the drying chamber, hence it is possible to prevent the heat from escaping to areas other than the human waste drying equipment and shorten the treating time of the human waste. Also, since the water vapor is recovered from the drying chamber and recirculated as the flush water, wasteful use of the flush water can be eliminated and the space required to hold the flush water can be reduced. Furthermore, since the high temperature heat of the exhaust gas of an internal combustion engine is used, the treating time of the human waste is short and both urine and stools can be conveniently treated. Also, since the treatment is conducted on human waste which has been discharged from the flush toilet, the toilet is available for bowel movements even during the treatment.

I claim:

1. An apparatus for treating human waste which comprises:
    heat accumulator provided in a discharge path of an exhaust gas from an internal combustion engine which gives resistance to passing of exhaust gas,
    a drying chamber provided next to said heat accumulator and connected downstream from a flush toilet in which the human waste and flush water discharged from the flush toilet is heated,
    a water accumulation chamber connected to said drying chamber which recovers water vapor from the drying chamber, and
    a pump which transports water from said water accumulation chamber to a flush tank for flush water, wherein said apparatus has an agitating device and also has an agitation chamber connected to said flush toilet and to said drying chamber which mixes the human waste and the flush water discharged from said flush toilet and discharges a mixture of waste and flush water to said drying chamber,
    a scraper provided in said drying chamber which scrapes off residual human waste stuck inside the drying chamber,
    a suction device which sucks the residual human waste scraped off from the inside of the drying chamber through a suction port provided in said drying chamber, and wherein
    said apparatus has a scraper and the scraper has a scraper roller, a rotating shaft, one pair of racks, one pair of spur gears and a reciprocating motion mechanism; said scraper roller is provided in said drying chamber and has a plurality of blades which, when rotated, scrape off the residual human waste stuck to the bottom surface in said drying chamber; said rotating shaft is secured at the center of said scraper roller; said one pair of racks is secured on either side of the inside of said drying chamber; said one pair of spur gears is secured on either end of said rotating shaft and engaged with said racks; and, said reciprocating motion mechanism supports said rotating shaft such that it can rotate, and said reciprocating motion mechanism power-drives said rotating shaft reciprocally in said drying chamber.

2. An apparatus for treating human waste as described in claim 1 which has an ozone generator connected to said drying chamber which delivers ozone to this drying chamber.

3. An apparatus for treating human waste as described in claim 1 wherein said heat accumulator is a muffler or a catalytic converter.

4. An apparatus for treating human waste as described in claim 1 wherein a radiating cooler is provided between said drying chamber and said water accumulation chamber.

5. An apparatus in accordance with claim 1 further comprising a vehicle.

6. An apparatus in accordance with claim 1 further comprising a vessel.

7. An apparatus for treating humany waste which comprises:
    a heat accumulator provided in a discharge path of an exhaust gas from an internal combustion engine which gives resistance to passing of exhaust gas,
    a drying chamber provided next to said heat accumulator and connected downstream from a flush toilet in which the human waste and flush water discharged from the flush toilet is heated,
    a water accumulation chamber connected to said drying chamber which recovers water vapor from the drying chamber, and
    a pump which transports water from said water accumulation chamber to a flush tank for flush water, wherein said apparatus has an agitating device and also has an agitation chamber connected to said flush toilet and to said drying chamber which mixes the human waste and the flush water discharged from said flush toilet and discharges a mixture of waste and flush water to said drying chamber,
    a scraper provided in said drying chamber which scrapes off residual human waste stuck inside the drying chamber,
    a suction device which sucks the residual human waste scraped off from the inside of the drying chamber through a suction port provided in said drying chamber, and
    wherein the heat accumulator heats the human waste and the flush water to a temperature of 600°–800° C. in said drying chamber.

8. An apparatus for treating human waste as described in claim 7 wherein said apparatus has a moving means which moves said scraper and said suction port in said drying chamber.

9. An apparatus for treating human waste as described in claim 8 which has an ozone generator connected to said drying chamber which delivers ozone to this drying chamber.

10. An apparatus for treating human waste as described in claim 8 wherein said heat accumulator is a muffler or a catalytic converter.

11. An apparatus for treating human waste as described in claim 7 which further comprises an ozone generator connected to said drying chamber which delivers ozone to this drying chamber.

12. An apparatus for treating human waste as described in claim 7 wherein said heat accumulator is a muffler or a catalytic converter.

13. An apparatus for treating human waste as described in claim 7 wherein a radiating cooler is provided between said drying chamber and said water accumulation chamber.

14. An apparatus in accordance with claim 7 further comprising a vehicle.

15. An apparatus in accordance with claim 7 further comprising a vessel.

* * * * *